Oct. 6, 1964 G. E. MINTZ 3,151,695
AIR CLEANER SEAL FOR TILT CAB VEHICLES
Filed May 2, 1962

INVENTOR
GERALD E. MINTZ
BY

HIS ATTORNEYS

United States Patent Office 3,151,695
Patented Oct. 6, 1964

3,151,695
AIR CLEANER SEAL FOR TILT CAB VEHICLES
Gerald E. Mintz, Emmaus, Pa., assignor to Mack Trucks, Inc., Plainfield, N.J., a corporation of New York
Filed May 2, 1962, Ser. No. 191,835
4 Claims. (Cl. 180—54)

This invention relates generally to a novel releasable connection between an air intake duct and an air cleaner for the engine on a truck having a tilt-type cab.

In trucks or tractors having a tilting type cab the air intake for the engine is mounted on the outside of the chassis of the truck and connected to an air cleaner mounted adjacent to the engine and connected to the carburetor or the intake manifold by means of an air inlet duct. As it is desirable to install such an air intake arrangement on current trucks in which the engine is mounted below the cab, and the entire cab tilts upwardly over the front bumper to expose the engine for maintenance purposes, a readily releasable connection is required between the air inlet duct mounted on the cab and the main body of the air cleaner mounted on the chassis. The connection must be flexible to permit relative movement between the air inlet duct and the air cleaner as the truck cab moves relative to the chassis in response to normal driving shock. Further the connection must be readily releasable so that the cab may be tilted upwardly to expose the engine for maintenance.

In accordance with the present invention a connection is provided which assures a leakproof relation between the air cleaner and the air intake duct when the cab is in operating position but permits ready disconnection of the air cleaner from the air intake as the cab is tilted to uncover the engine for servicing.

More particularly, in accordance with the invention, the conduit supplying air to the air cleaner is provided with a flexible section for dissipating shock and vibration and compensating for relative movement between the tilting cab of a vehicle and the chassis thereof, and a magnetic element for securing the flexible section of the air intake duct on the cab to the relatively fixed air cleaner on the chassis. The magnetic element may engage directly with the metal shell of the air cleaner or with a metallic portion of a coupling communicating with the air cleaner so that a substantially air tight connection is provided which may, nevertheless, be readily released as the cab is tilted relative to the chassis.

For a better understanding of the invention, reference may be had to the accompanying drawing in which.

Figure 2:
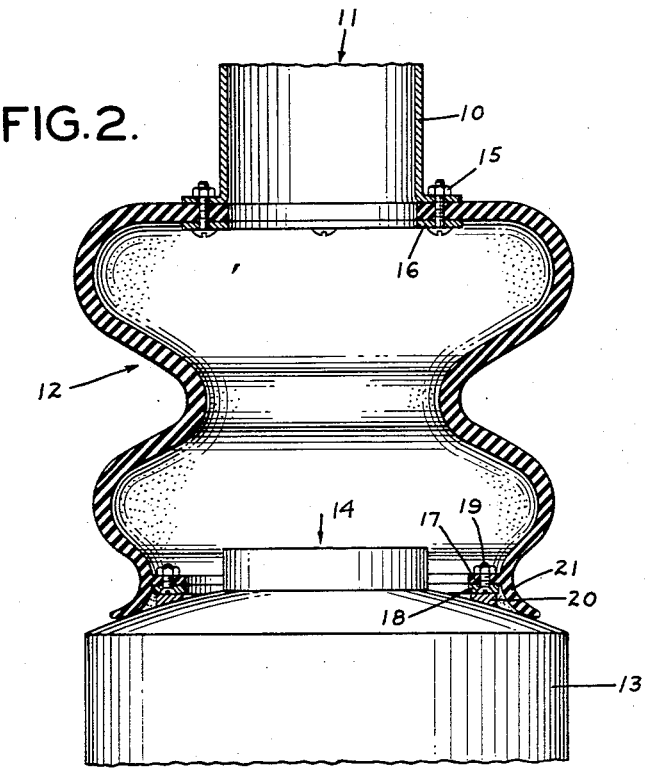
FIGURE 2 is a view in vertical section of a typical air cleaner connection embodying the present invention.
Figure 1:
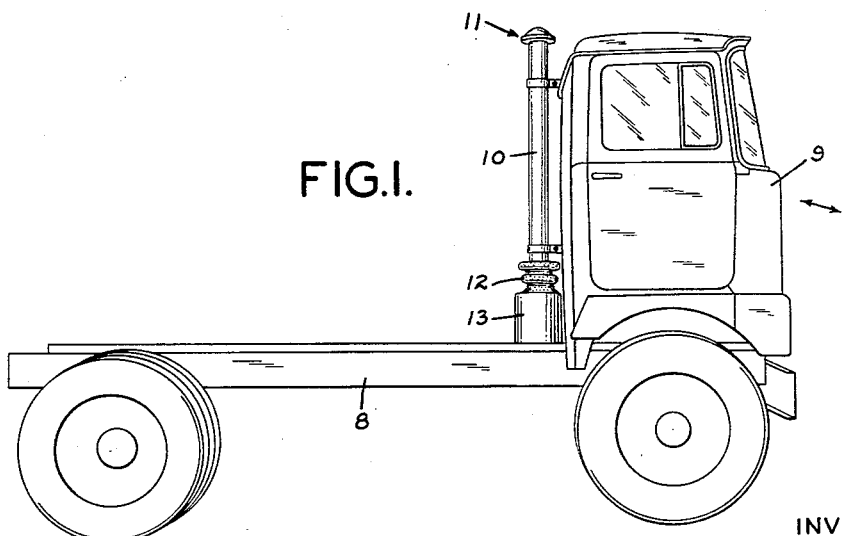
FIGURE 1 is a view in side elevation of a typical tilting cab vehicle having an air cleaner connection of the type embodying the invention.

FIG. 1 illustrates a tilting cab vehicle having a wheel supported chassis 8, supporting for tilting movement at its forward end a cab 9, beneath which is located the engine (not shown) for driving the vehicle. An air intake stack 10 is mounted on the back of the cab or on any other suitable location and is attached to the cab. The stack supplies air to the engine through an air cleaner by means of a releasable connection to be described hereinafter which enables the cab to be tilted relative to the chassis to uncover the engine.

Air enters through the stack 10 as represented by arrow 11, passes through a bellows-like flexible member 12 on the lower end of the stack and enters the air cleaner 13 mounted on the chassis 8 as indicated by arrow 14. The member 12 may be made of any suitable material and shape. The bellows-shape indicated is preferred as it permits free movement of stack 10 relative to air cleaner 13 in both vertical and horizontal directions and dissipates shock and vibration which might otherwise be transmitted between the stack and the air cleaner. Typical materials for the flexible member 12 include, but are not limited to, rubber, synthetic rubbers, plastics, and other elastomeric materials, plastic or rubber impregnated cloth, and the like. The flexible member 12 is attached to the flanged lower end of the stack 10 by means of screws, bolts or the like 15 and annular retaining ring 16. An annular internal flange 17 is formed on the bellows. This flange supports an annular ring 18 which is connected to the flange 17 by means of screws 19. Ring 18 carries a plurality of magnets 20 such as "Alnico" magnets which are adapted to engage the upper surface of the air cleaner 13, which as is customary, has a casing formed of sheet steel, iron or the like. A lip 21 on the flexible member 12 extends outwardly and lies against the top surface of air cleaner 13 where the magnets are in engagement with the air cleaner 13. During operation of the engine, a reduced pressure develops inside member 12 which causes lip 21 to press firmly against the surface of the air cleaner 13 thereby sealing the bellows to the air cleaner and restricting entry of air to the stack 10 which has its upper end above the roadway and thus has less tendency to draw in dust, exhaust fumes and the like.

Preferably, although not necessarily, at least three magnets 20 spaced around ring 18 are provided to hold the ring 18 substantially parallel to the top of the air cleaner. The magnets 20 preferably have their lower surfaces disposed to engage the air cleaner throughout the width of the magnets and, as illustrated their lower surfaces are inclined at an angle to the top surfaces. Alternatively, magnets 20 and ring 18 may be replaced by a single angular ring which has been magnetized so that it will engage the air cleaner 13.

With the connection described, and with magnets of suitable magnetic strengths, the lower end of the connecting member 12 will be secured strongly to the air cleaner 13 with the lip 21 providing a leak-proof connection to the air cleaner. The flexibility of the member 12 will at the same time permit substantial movement of the stack 10 relative to the air cleaner without breaking the leak-proof connection between them. When the cab is to be tilted the ring 18 and magnets can be pried loose from the air cleaner with a screw driver or the like thereby releasing the stack from the air cleaner. However, in the preferred embodiment the bellows are strong enough to pull the magnets free of the cleaner when the cab is tilted.

The foregoing example of this invention is given for illustrative purposes only and is not intended to limit the scope of this invention as defined by the appended claims.

I claim:

1. A releasable connection for a tilting cab vehicle having a substantially fixed air cleaner and an air intake stack movable with said cab, comprising a flexible connection for connecting said air intake stack and said air cleaner and magnetic means on said connection and said air cleaner for detachably connecting said flexible connection and air cleaner.

2. A releasable connection for a tilting cab vehicle having a substantially fixed air cleaner and an air intake stack movable with said cab comprising a flexible bellows-shaped member connected at one end to said stack for supplying air from said air intake stack to said air cleaner and magnetic means on said member and air cleaner for detachably connecting the other end of said bellows-shaped member and said air cleaner.

3. A releasable connection for a tilting cab vehicle having a substantially fixed air cleaner and an air intake stack movable with said cab comprising a flexible bellows-shaped member for connecting said air intake stack and said air cleaner, magnetic means on said air cleaner and said member for detachably connecting said flexible connection and said air cleaner, and an overhanging flexible sealing lip on said member extending around said magnetic means and engaging said air cleaner.

4. A releasable connection for a tilting cab vehicle having a substantially fixed air cleaner and an air intake stack relatively movable with said cab comprising a flexible bellows-shaped member for connecting said air inlet stack and said air cleaner, and a plurality of magnets attached to said member adapted to engage corresponding steel surfaces on said air cleaner.

References Cited in the file of this patent

UNITED STATES PATENTS

| | | |
|---|---|---|
| 2,147,482 | Butler | Feb. 14, 1939 |
| 2,701,024 | Thomas | Feb. 1, 1955 |
| 2,925,874 | Norrie | Feb. 23, 1960 |
| 2,952,327 | Farr | Sept. 13, 1960 |
| 2,990,198 | Imming | June 27, 1961 |
| 3,017,944 | Norrie | Jan. 23, 1962 |

FOREIGN PATENTS

| | | |
|---|---|---|
| 492,612 | Germany | Mar. 3, 1930 |
| 771,619 | Great Britain | Apr. 3, 1957 |